No. 760,264. PATENTED MAY 17, 1904.
E. E. SLICK.
ANTIFRICTION BEARING.
APPLICATION FILED MAR. 7, 1900. RENEWED APR. 6, 1901.
NO MODEL.

WITNESSES
Ida M. Dumont
C. H. Walker

INVENTOR
Edwin E. Slick.
By W. D. Grosbeck
Associate Attorney.

THE NORRIS PETERS CO., PHOTO-LITHO., WASHINGTON, D. C.

No. 760,264. Patented May 17, 1904.

UNITED STATES PATENT OFFICE.

EDWIN E. SLICK, OF BRADDOCK, PENNSYLVANIA.

ANTIFRICTION-BEARING.

SPECIFICATION forming part of Letters Patent No. 760,264, dated May 17, 1904.

Application filed March 7, 1900. Renewed April 6, 1901. Serial No. 54,737. (No model.)

*To all whom it may concern:*

Be it known that I, EDWIN E. SLICK, of Braddock, Allegheny county, Pennsylvania, have invented a new and useful Improvement in Antifriction-Bearings, of which the following is a full, clear, and exact description, reference being had to the accompanying drawings, forming part of this specification, in which—

Figure 1:
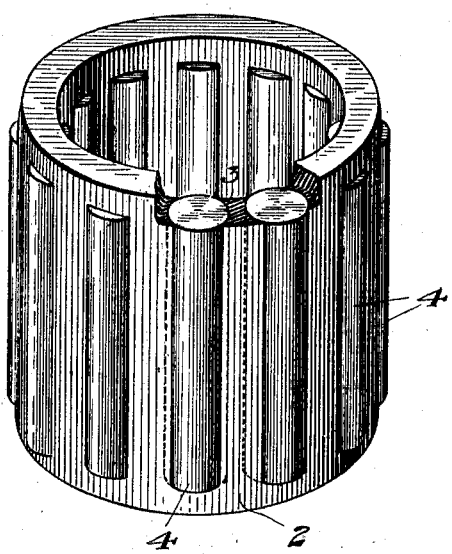
Figure 2:
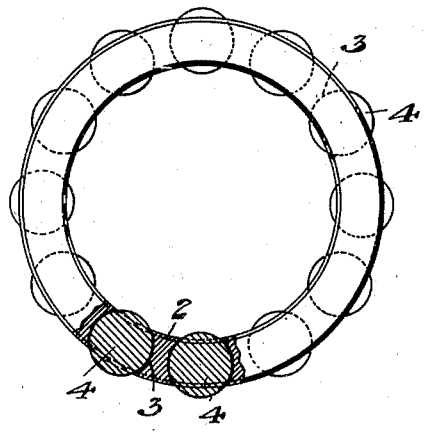

Figure 1 is a perspective view, partly broken away, showing one form of my improved bearing; and Fig. 2 is an end elevation of the same, partly broken away.

My invention relates to that class of bearings wherein a cage is provided in which are retained a set of antifriction rolling elements, such as rollers.

Heretofore in the manufacture of these cages they have been built up from separate machined parts, which were assembled and secured together about the rollers. The accurate machining necessary for the different parts in such constructions has made these bearings expensive, difficult to make, and liable to injury and getting out of order. My invention overcomes this difficulty; and it consists in an antifriction-bearing comprising a cage formed in one integral piece and having openings with concave or overhanging walls receiving and holding the rolling elements in place.

In the drawings, in which I show a roller-bearing constructed in accordance with my invention, 2 represents the cage, which consists of a retainer of suitable form, preferably of cast metal, such as Babbitt or other antifriction metal, and having therein slots with closed ends and concave side walls 3 3, which fit about the rollers 4. The ends of the cage are in the same integral piece with the body, and the concave walls hold the rollers, keep them in proper alinement, and prevent their falling out.

In making the bearing I preferably place the rollers in a mold of suitable construction and cast the metal of the cage about them in one integral piece, the metal being shaped by the rollers and the mold. When the cage is taken from the mold, the bearing is complete, and the article may be used in such condition. I prefer, however, after casting to force the rollers radially in the cage by means of an expanding mandrel or other suitable mechanism. This radial forcing of the rollers distorts the walls of the recesses and allows a slight radial movement of the rollers, thus loosening them and allowing them to fit to the shaft or other rotating part.

The advantages of my invention result from the simplicity and ease of manufacture of the bearing, also from the accuracy of alinement between the rollers and cage. The bearing is also stronger than the built-up cages formerly used.

The antifriction elements may be of other form than that of rollers, such as cones or balls, the shape and size of the cage may be varied, as well as the method of making it, and other variations may be made without departing from my invention.

I claim—

1. A roller-bearing, comprising an integral cylindrical body or cage having intact ends, said body or cage having a plurality of slots therein with concave walls, both ends of each slot being closed by the intact portions of the cage, and rollers fitting within said slots and retained in place by the edges of the walls of the slot; substantially as described.

2. A roller-bearing comprising an integral cylindrical body or cage having intact ends, said body or cage having a plurality of slots therein, both ends of each slot being closed by the intact portions of the cage, and rollers fitting in said slots, the edges of the slots overhanging and retaining said rollers in place; substantially as described.

3. An antifriction-bearing comprising an integral cage formed from a single piece of cast metal with intact ends, said cage having a plurality of openings with concave walls and antifriction rolling elements fitting within the openings and retained in place by their walls; substantially as described.

4. An antifriction-bearing comprising an integral cage formed of a single piece of metal with intact ends, said cage having a plurality of openings with walls having overhanging edges, and antifriction rolling elements within the openings and held by the overhanging edges; substantially as described.

5. A roller-bearing comprising a cage formed of a single piece of cast metal with a cylindrical body having intact ends, said body or cage having a plurality of slots with overhanging edges, both ends of each slot being closed by the intact portions of the cage, and rollers fitting within said slots and held in place by the edges of the walls of the slots, said slots being arranged to permit a slight lateral movement of the rollers; substantially as described.

In testimony whereof I have hereunto set my hand.

EDWIN E. SLICK.

Witnesses:
F. F. SLICK,
SIDNEY DILLON.